US007807597B2

(12) United States Patent
Elomari et al.

(10) Patent No.: US 7,807,597 B2
(45) **Date of Patent: *Oct. 5, 2010**

(54) REGENERATION OF IONIC LIQUID CATALYST USING A REGENERATION METAL IN THE PRESENCE OF ADDED HYDROGEN

(75) Inventors: Saleh Elomari, Fairfield, CA (US); Thomas V. Harris, Benicia, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 12/099,486

(22) Filed: Apr. 8, 2008

(65) Prior Publication Data

US 2009/0253572 A1 Oct. 8, 2009

(51) Int. Cl.

| | |
|---|---|
| ***B01J 35/12*** | (2006.01) |
| ***B01J 20/34*** | (2006.01) |
| ***B01J 21/20*** | (2006.01) |
| ***B01J 23/90*** | (2006.01) |
| ***B01J 25/04*** | (2006.01) |
| ***B01J 27/28*** | (2006.01) |
| ***B01J 29/90*** | (2006.01) |
| ***B01J 31/40*** | (2006.01) |
| ***B01J 38/00*** | (2006.01) |
| ***B01J 38/48*** | (2006.01) |
| ***B01J 38/68*** | (2006.01) |
| ***B01J 38/04*** | (2006.01) |
| ***B01J 38/10*** | (2006.01) |
| ***B01J 21/04*** | (2006.01) |
| ***B01J 23/02*** | (2006.01) |

(52) U.S. Cl. ............................... 502/53; 502/3; 502/20; 502/22; 502/24; 502/34; 502/439

(58) Field of Classification Search .................. 502/53, 502/150, 3, 20, 22, 24, 34, 439
See application file for complete search history.

(56) References Cited

U.S. PATENT DOCUMENTS

| | | | |
|---|---|---|---|
| 4,122,245 | A | 10/1978 | Nardi et al. |
| 4,463,071 | A | 7/1984 | Gifford et al. |
| 4,463,072 | A | 7/1984 | Gifford et al. |
| 5,104,840 | A | 4/1992 | Chauvin et al. |
| 5,731,101 | A | 3/1998 | Sherif et al. |
| 6,096,680 | A | 8/2000 | Park |
| 6,797,853 | B2 | 9/2004 | Houzvicka et al. |
| 2004/0077914 | A1 | 4/2004 | Zavilla et al. |
| 2004/0133056 | A1 | 7/2004 | Liu et al. |

OTHER PUBLICATIONS

Christopher J. Adams, et al., Stereoslective hydogenation reactions in chloroaluminate (III) ionic liquids: a new method for the reduction of aromatic compounds, Institute of Applied Catalysis, Schoold of Chemistry, 1999, 1043-1044, Received in Cambridge, UK) Feb. 15, 1999, Accepted Apr. 19, 1999.

*Primary Examiner*—Jerry Lorengo
*Assistant Examiner*—James E McDonough
(74) *Attorney, Agent, or Firm*—Susan M. Abernathy; Steven H. Roth

(57) ABSTRACT

A process for regenerating a used acidic ionic liquid catalyst comprising contacting the used ionic liquid catalyst with at least one ‘regeneration’ metal in a regeneration zone in the presence of added hydrogen under regeneration conditions for a time sufficient to increase the activity of the ionic liquid catalyst is described. In one embodiment, regeneration is conducted in the presence of a hydrocarbon solvent.

23 Claims, No Drawings

REGENERATION OF IONIC LIQUID CATALYST USING A REGENERATION METAL IN THE PRESENCE OF ADDED HYDROGEN

This application is a continuation in part of appending U.S. Patent Publication Numbers 20070142214 and 20070142217, both filed on Dec. 20, 2005.

FIELD OF THE INVENTION

The present invention relates to methods for the regeneration of catalysts and more specifically to the regeneration of ionic liquid catalysts.

BACKGROUND OF THE INVENTION

Ionic liquids are liquids that are composed entirely of ions. The so-called "low temperature" ionic liquids are generally organic salts with melting points under 100 degrees C., often even lower than room temperature. Ionic liquids maybe suitable for example for use as a catalyst and as a solvent in alkylation and polymerization reactions as well as in dimerization, oligomerization acetylation, metatheses, and copolymerization reactions.

One class of ionic liquids is fused salt compositions, which are molten at low temperature and are useful as catalysts, solvents and electrolytes. Such compositions are mixtures of components which are liquid at temperatures below the individual melting points of the components.

Ionic liquids can be defined as liquids whose make-up is entirely comprised of ions as a combination of cations and anions. The most common ionic liquids are those prepared from organic-based cations and inorganic or organic anions. The most common organic cations are ammonium cations, but phosphonium and sulphonium cations are also frequently used. Ionic liquids of pyridinium and imidazolium are perhaps the most commonly used cations.

Anions include, but not limited to, $BF_4^-$, $PF_6^-$, haloaluminates such as $Al_2Cl_7^-$ and $Al_2Br_7^-$, $[(CF_3SO_2)_2N)]^-$, alkyl sulphates ($RSO_3^-$), carboxylates ($RCO_2^-$) and many other. The most catalytically interesting ionic liquids are those derived from ammonium halides and Lewis acids (such as $AlCl_3$, $TiCl_4$, $SnCl_4$, $FeCl_3$ . . . etc). Chloroaluminate ionic liquids are perhaps the most commonly used ionic liquid catalyst systems.

Examples of such low temperature ionic liquids or molten fused salts are the chloroaluminate salts. Alkyl imidazolium or pyridinium salts, for example, can be mixed with aluminum trichloride ($AlCl_3$) to form the fused chloroaluminate salts. The use of the fused salts of 1 -alkylpyridinium chloride and aluminum trichloride as electrolytes is discussed in U.S. Pat. No. 4,122,245. Other patents which discuss the use of fused salts from aluminum trichloride and alkylimidazolium halides as electrolytes are U.S. Pat. Nos. 4,463,071 and 4,463,072.

U.S. Pat. No. 5,104,840 to describes ionic liquids which comprise at least one alkylaluminum dihalide and at least one quaternary ammonium halide and/or at least one quaternary ammonium phosphonium halide and their uses as solvents in catalytic reactions.

U.S. Pat. No. 6,096,680 describes liquid clathrate compositions useful as reusable aluminum catalysts in Friedel-Crafts reactions. In one embodiment, the liquid clathrate composition is formed from constituents comprising (i) at least one aluminum trihalide, (ii) at least one salt selected from alkali metal halide, alkaline earth metal halide, alkali metal pseudohalide, quaternary ammonium salt, quaternary phosphonium salt, or ternary sulfonium salt, or a mixture of any two or more of the foregoing, and (iii) at least one aromatic hydrocarbon compound.

Aluminum-containing catalysts are among the most common Lewis acid catalysts employed in Friedel-Crafts reactions. Friedel-Crafts reactions are reactions which fall within the broader category of electrophylic substitution reactions including alkylations.

Other examples of ionic liquids and their methods of preparation may also be found in U.S. Pat. Nos. 5,731,101; 6,797,853 and U.S. Patent Application Publications 2004/0077914 and 2004/0133056.

Hydrogenation is chloroaluminate ionic liquids in the presence of an electropositive metal and HCl was reported by K. R. Seddon et al in *Chem. Commun.,* 1999, 1043-1044.

As a result of use, ionic liquid catalysts become deactivated, i.e. lose activity, and may eventually need to be replaced. However, ionic liquid catalysts are expensive and replacement adds significantly to operating expenses by in some cases requiring shut down of an industrial process. One of the heretofore unsolved problems impeding the commercial use of chloroaluminate ionic liquid catalysts has been the inability to regenerate acidic recycle them. The present invention provides methods to regenerate acidic chloroaluminate ionic liquid catalysts overcoming this obstacle and paving the way for the practical, commercial use of these environmentally friendly catalysts.

SUMMARY OF THE INVENTION

The present invention, among other things, provides a process for regenerating a used acidic ionic liquid catalyst comprising contacting the used ionic liquid catalyst with at least one metal in a regeneration zone in the presence of added hydrogen under regeneration conditions for a time sufficient to increase the activity of the ionic liquid catalyst. In one embodiment, regeneration is conducted in the presence of a hydrocarbon solvent.

DETAILED DESCRIPTION

The present invention relates to a process for the regeneration of spent or deactivated acidic ionic liquid-based catalysts i.e. those catalysts which have lost all or some of their catalytic activity. The present process is being described and exemplified with reference certain specific ionic liquid catalysts and processes catalyzed thereby, but such description is not intended to limit the scope of the invention. The methods described may be applied to other catalysts and processes by those persons having ordinary skill based on the teachings, descriptions and examples included herein.

The specific examples used herein refer to alkylation processes using ionic liquid systems, which are amine-based cationic species mixed with aluminum chloride. In such systems, to obtain the appropriate acidity suitable for the alkylation chemistry, the ionic liquid catalyst is generally prepared to full acidity strength by mixing one molar part of the appropriate ammonium chloride with two molar parts of aluminum chloride. The catalyst exemplified for the alkylation process is a 1-alkyl-pyridinium chloroaluminate, such as 1-butyl-pyridinium heptachloroaluminate:

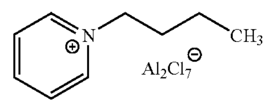

1-Butyl-pyridinium heptachloroaluminate

In general, a strongly acidic ionic liquid is necessary for isoparaffin alkylation, e.g. isoparaffin alkylation. In that case, aluminum chloride, which is a strong Lewis acid in a combination with a small concentration of a Broensted acid, is a preferred catalyst component in the ionic liquid catalyst scheme.

While not being bound to this or any other theory of operation, the present invention is based in part on our discovery that one of the major catalyst deactivation mechanisms is the formation of by-products known as conjunct polymers. The term conjunct polymer was first used by Pines and Ipatieff to distinguish these polymeric molecules from the usual polymers. Unlike typical polymers, conjunct polymers are polyunsaturated cyclic, polycyclic and acyclic molecules formed by concurrent acid-catalyzed reactions including, among others, polymerization, alkylation, cyclization, and hydride transfer reactions. Conjunct polymers consist of unsaturated intricate network of molecules that may include one or a combination of 4-, 5-, 6- and 7-membered rings in their skeletons. Some examples of the likely polymeric species were reported by Miron et al. (*Journal of chemical and Engineering Data,* 1963) and Pines (*Chem. Tech,* 1982). These molecules contain double and conjugated double bonds in intricate structures containing a combination of cyclic and acyclic skeletons.

The conjunct polymers deactivate the chloroaluminate ionic liquid catalysts by weakening the acid strength of the catalyst through the formation of complexes of conjunct polymers and $AlCl_3$ possibly by means of electron-donor/electron-acceptor interactions. The conjunct polymers with their double bonds are the donors and the Lewis acid ($AlCl_3$) is the acceptor. Using their double bonds, the conjunct polymers coordinate to the Lewis acid ($AlCl_3$) in the ionic liquid and rendering the butylpyridinium chloroaluminate catalyst less active. Thus, the acidity of the catalyst becomes weaker and the overall catalytic activity becomes compromised and no longer effective for the intended purpose. Thus, the catalyst performance will become a function of the concentration of conjunct polymers in the ionic liquid phase. As more conjunct polymers accumulate in the ionic liquid phase the catalyst becomes less active. So, removal of all or a suitable portion of the conjunct polymers from the ionic liquid phase is a significant aspect of the present process for ionic liquids catalyst regeneration.

The term “conjunct polymer” as used herein also includes any other species which might complex to $AlCl_3$ by pi bonding or sigma bonding or other means, which results in those species binding to the ionic liquid, so they are not removable by simple hydrocarbon extraction.

It is believed that deactivation of the catalyst by the presence of conjunct polymers is, in part at least, caused by coordination and complex formation between the Lewis acid AlCl3 (electron pair acceptor) and the conjunct polymers (electron donors). In such complexes, the $AlCl_3$ is no longer available for catalysis since it is tied-up in the $AlCl_3$-conjunct polymers complexes. $AlCl_3$-conjunct polymers complexation may not be limited to the donor-acceptor (base-acid) mechanisms. HCl-promoted chloroaluminate: ionic liquid-catalyzed alkylations lead very often to the formation of chlorinated conjunct polymers. Consequently, some of the aluminum trichloride-conjunct polymers complexes will be the result of interaction between $AlCl_3$ and the chlorinated polymers to form $R^+AlCl_4^-$ type intermediates. It also appears that the presence (or accumulation) of conjunct polymer molecules in the catalyst phase is not by virtue of being miscible in the ionic liquid phase. While conjunct polymers may be somewhat miscible in the ionic liquids, their accumulation in the catalyst phase is more likely to being bound by strong acid-base interactions or other forms of complexation rather than being soluble in the ionic liquid phase.

Conjunct polymers isolated from the catalyst phase by means of hydrolysis are highly soluble in hydrocarbons. However, attempts to remove them from the catalyst phase prior to hydrolysis by simple extraction methods with hydrocarbon solvents such as hexane, decane and toluene were unsuccessful. Other more polar solvents such as $CH_2Cl_2$ may dissolve a chloroaluminate ionic liquid and therefore are not selective solvents for dissolving and removing conjunct polymers. Conjunct polymers may be isolated by hydrolysis. However, these methods of isolating the conjunct polymers are destructive, and result in an actual loss of a catalytic component ($AlCl_3$). The hydrolysis methods hydrolyze the catalytic component ($AlCl_3$) and transform it into inactive aluminum hydroxide and aluminum oxide. This indicates that the conjunct polymers are tightly held in the ionic liquid phase by fairly strong type of bonding system. Therefore, any successful attempt to reactivate and regenerate the catalyst must involve the removal of conjunct polymers to release aluminum trichloride from the $AlCl_3$— conjunct polymer complexes without destroying, consuming, or irreversibly tying up the $AlCl_3$. In other words, one objective is to free the catalyst by replacing the conjunct polymers with other basic species that simply displace the polymer without destroying the catalyst or by suppressing the ability of conjunct polymers to form complexes with Lewis acids (aluminum chloride).

The deactivated catalyst can be revived in a nondestructive manner by freeing up the $AlCl_3$ from conjunct polymer-$AlCl_3$ complex $AlCl_3$ no longer bound by conjunct polymers is then released to take part in catalytic reactions.

Among other things, the present invention provides a process for the regeneration of used acidic ionic liquid catalysts in a nondestructive manner by contacting a used ionic liquid catalyst with at least one metal catalyst under regeneration conditions in the presence of added hydrogen so as to increase the activity of the used ionic liquid catalyst.

In accordance with the present invention, the used ionic liquid contacts the regeneration metal in the presence of added hydrogen. Hydrogen pressures used may vary from quite low to very high values, typically from about 100 to 2,500 psig.

The metal used for regeneration in this invention is preferably selected from Group III-A and II-B. Specific examples of the metal catalysts are B, Al, Ga, In, Tl, Zn, Cd, Cu, Ag and Au. These metals may be used in any form, alone, in combination or as alloys. For example, the regeneration metal may be used with other substances such as an inorganic oxide catalyst supports.

The metals may be in the form of fine particles, granules, sponges, gauzes, etc. Each metal may be used in any number of forms: (1) macroscopic, which includes wires, foils, fine particles, sponges, gauzes, granules, etc.; and (2) microscopic, which includes powders, smokes, colloidal suspensions, and condensed metal films.

An appropriately effective amount of metal is employed in the practice of the present invention. The amount of metal, say aluminum, added in the regeneration scheme is determined by the amount (concentration) of the conjunct polymers in the spent ionic liquid catalyst. For example, the amount of metal used for the regeneration of a given spent catalyst is usually added in excess to the concentration of conjunct polymers present in the spent catalyst.

The metal selection for the regeneration is based on the composition of the ionic liquid catalyst. The metal should be selected carefully to prevent the contamination of the catalyst with unwanted metal complexes or intermediates that may form and remain in the ionic liquid catalyst phase. For example, aluminum metal will be the metal of choice for the regeneration when the catalyst system is chloroaluminate ionic liquid-based catalyst. The use of any other metal may change the overall composition of the catalyst.

As noted previously, ionic liquid catalysts may become deactivated during use. For example, in an alkylate production unit, light ($C_2$-$C_5$) olefins and isoparaffin feeds are contacted in the presence of a catalyst that promotes the alkylation reaction. In one embodiment of a process in accordance with the present invention, this catalyst is a chloroaluminate ionic liquid. The reactor, which may be a stirred tank or other type of contactor (e.g., riser reactor), produces a biphasic mixture of alkylate hydrocarbons, unreacted isoparaffins, and ionic liquid catalyst containing some conjunct polymers. The dense catalyst/conjunct polymer phase may be separated from the hydrocarbons by gravity settling in a decanter. This catalyst will be partially deactivated by the conjunct polymers binding to $AlCl_3$. The recovered catalyst can be reactivated in a regeneration scheme in the presence of added hydrogen and a metal catalyst. The products of this step will be reactivated catalyst and removable conjunct polymers among others as described herein. The reactivated catalyst and the conjunct polymers can be separated now, for example, by solvent extraction, decantation, and filtration.

In one embodiment of the present invention, a used ionic liquid catalyst/conjunct polymer mixture is introduced continuously, into a regeneration reactor, which contains a regeneration metal. Hydrogen gas and inert hydrocarbons in which conjunct polymers are soluble are fed into the reactor at the desired rate. The inert hydrocarbons may be a normal hydrocarbons ranging from $C_5$-$C_{15}$ and their mixtures, preferably $C_5$-$C_8$ although other hydrocarbons may be employed. The residence time, temperature and pressure of the reactor will be selected to allow the desired reactivation of the ionic liquid catalyst. The reaction product is withdrawn and sent to a separator. This mixture is then separated into three streams, one comprising hydrogen and light hydrocarbons, a second comprising inert hydrocarbons and removable conjunct polymers and a third comprising regenerated ionic liquid catalyst. A gravity decanter is used to separate the mixture, from which the ionic liquid phase, which is denser than other components, is withdrawn. The reactivated ionic liquid catalyst is returned to the alkylation reactor. The solvent/conjunct polymer mix is separated by distillation to recover the solvent.

It is not necessary to regenerate the entire charge of catalyst. In some instances only a portion or slipstream of the catalyst charge is regenerated. In those instances only as much ionic liquid catalyst is regenerated as is necessary to maintain a desired level of catalyst activity in the process in which the ionic liquid is used as the catalyst.

Regeneration conditions will generally include temperatures of −20° C.-200° C., preferably 50°-100° C. pressures of atmospheric-5000 psig, preferably 50-500 psig, and a contact time of 0.1 minute-24 hours, and preferably from ½-2 hours in a normal hydrocarbon as a solvent. Hydrogen pressures used may vary from quite low to very high values, typically from about 100 to 2,500 psig.

The following Examples are illustrative of the present invention, but are not intended to limit the invention in any way beyond what is contained in the claims which follow.

EXAMPLES

Example 1

Preparation of Fresh 1-Butylpyridinium Chloroaluminate Ionic Liquid Catalyst A (Fresh IL A)

1-butyl-pyridinium chloroaluminate is a room temperature ionic liquid prepared by mixing neat 1-butyl-pyridinium chloride (a solid) with neat solid aluminum trichloride in an inert atmosphere. The syntheses of butylpyridinium chloride and the corresponding 1-butyl-pyridinium chloroaluminate are described below. In a 2-L Teflon-lined autoclave, 400 gm (5.05 mol.) anhydrous pyridine (99.9% pure purchased from Aldrich) were mixed with 650 gm (7 mol.) 1-chlorobutane (99.5% pure purchased from Aldrich). The neat mixture was sealed and let to stir at 125° C. under autogenic pressure over night. After cooling off the autoclave and venting it, the reaction mix was diluted and dissolved in chloroform and transferred to a three liter round bottom flask. Concentration of the reaction mixture at reduced pressure on a rotary evaporator (in a hot water bath) to remove excess chloride, unreacted pyridine and the chloroform solvent gave a tan solid product. Purification of the product was done by dissolving the obtained solids in hot acetone and precipitating the pure product through cooling and addition of diethyl ether. Filtering and drying under vacuum and heat on a rotary evaporate or gave 750 gm (88% yields) of the desired product as an off-white shiny solid. $^1$H-NMR and $^{13}$C-NMR were consistent with the desired 1-butyl-pyridinium chloride and no impurities were observed.

1-butylpyridinium chloroaluminate was prepared by slowly mixing dried 1-butylpyridinium chloride and anhydrous aluminum chloride ($AlCl_3$) according to the following procedure. The 1-butylpyridinium chloride (prepared as described above) was dried under vacuum at 80° C. for 48 hours to get rid of residual water (1-butylpyridinium chloride is hydroscopic and readily absorbs water from exposure to air). Five hundred grams (2.91 mol.) of the dried 1-butylpyridinium chloride were transferred to a 2-Liter beaker in a nitrogen atmosphere in a glove box. Then, 777.4 gm (5.83 mol.) of anhydrous powdered $AlCl_3$ (99.99% from Aldrich) were added in small portions (while stirring) to control the temperature of the highly exothermic reaction. Once all the $AlCl_3$ was added, the resulting amber-looking liquid was left to gently stir overnight in the glove box. The liquid was then filtered to remove any un-dissolved $AlCl_3$. The resulting acidic 1-butyl-pyridinium chloroaluminate was used as the catalyst for the alkylation of isoparaffins with light olefins.

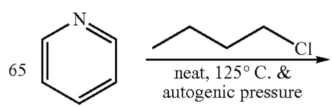

-continued

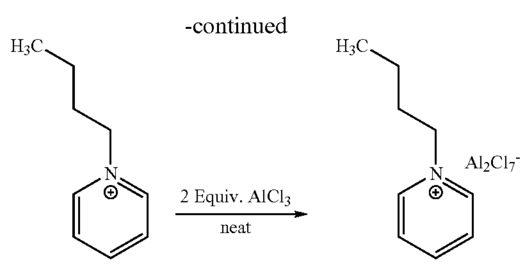

Example 2

Preparation of "Deactivated" 1-Butylpyridinium Chloroaluminate Ionic Liquid Catalyst (Deactivated Catalyst A)

"Deactivated" or "used" 1-butylpyridinium chloroaluminate ionic liquid catalyst was prepared from "fresh" 1-butylpyridinium chloroaluminate ionic liquid catalyst by carrying out the isobutane alkylation reaction in a continuous flow microunit under catalyst recycle with accelerated fouling conditions.

The microunit consists of feed pumps for isobutane and butenes, a stirred autoclave reactor, a back pressure regulator, a three phase separator, and a third pump to recycle the separated ionic liquid catalyst back to the reactor. The reactor was operated at 80 to 100 psig pressure and with cooling to maintain a reaction temperature of ~10° C. To start the reaction, isobutane, butenes, and HCl were pumped into the autoclave at the desired molar ratio (isobutene/butenes >1.0), through the back pressure regulator, and into the three phase separator. At the same time, fresh chloroaluminate ionic liquid catalyst was pumped into the reactor at a rate pre-calculated to give the desired catalysts/feed ratio on a volumetric basis. As the reaction proceeded, ionic liquid separated from the reactor effluent and collected in the bottom of the three phase separator. When a sufficient level of catalyst built up in the bottom of the separator, the flow of fresh ionic liquid was stopped and catalyst recycle from the bottom of the separator was started. In this way, the initial catalyst charge was continually used and recycled in the process.

The following process conditions were used to generate Deactivated Catalyst A (1-butylpyridinium chloroaluminate ionic liquid catalyst) from Fresh Catalyst A:

| Process Variable | | |
|---|---|---|
| Isobutane pump rate | 4.6 | g/min |
| Butene pump rate | 2.2 | g/min |
| IL Catalyst pump rate | 1.6 | g/min |
| HCl flow rate | 3.0 | SCCM |
| pressure | 100 | psig |
| temperature | 10 | ° C. |

The reaction was continued for 72 hours when it was judged that the catalyst had become sufficiently deactivated.

Example 3

Determination of the Amounts of Conjunct Polymer and Olefin Oligomers in Deactivated IL A The wt % of conjunct polymers in the spent (deactivated) ionic liquid was determined by hydrolysis of known weights of the spent catalyst. The example below is a typical procedure for measuring conjunct polymers in a given spent catalyst. In a glove box, 15 gm of a spent ionic liquid catalyst in a flask were rinsed first with 30-50 ml of anhydrous hexane to remove (from the spent catalyst) any residual hydrocarbon or olefinic oligomers. The hexane rinse was concentrated under reduced pressure to give only 0.02 gm of yellow oil (0.13%). Then, 50 ml of anhydrous hexane was added to the rinsed catalyst followed by slow, addition of 15 ml of water, and the mixture was stirred at 0° C. for 15-20 minutes. The resulting mixture was diluted with additional 30 ml hexanes and stirred well for additional 5-10 minutes. The mixture was allowed to settle down to two layers solution and some solid residue. The organic layer was recovered by decanting. The aqueous layer was further washed with additional 50 ml hexanes. The hexanes layers were combined and dried over anhydrous $MgSO_4$, filtered and concentrated to give 2.5 gm (16.7 wt % of the spent catalyst) of viscous dark orange-reddish oil. It was determined therefore that this particular spent catalyst contains 0.13% oligomers and 16.7% conjunct polymers. The hydrolysis can also be accomplished using acidic (aqueous HCl) or basic (aqueous NaOH) solutions.

Example 4

Characterization of Recovered Conjunct Polymer from Deactivated IL A

The recovered conjunct polymers according to the procedure described in Example 3 were characterized by elemental analysis and by infrared, NMR, GC-Mass and UV and spectroscopy methods. The recovered conjunct polymers have hydrogen/carbon ratio, of 1.76 and chlorine content of 0.8%. $^{1}$H-NMR and $^{13}$C-NMR showed the presence of olefinic protons and olefinic carbons. Infra Red indicated the presence of olefinic regions and the presence of cyclic systems and substituted double bonds. GCMS showed the conjunct polymers to have molecular weights ranging from 150-mid 600s. The recovered conjunct polymers have boiling ranges of 350-1100° F. as indicated by high boiling simulated distillation analysis. UV spectroscopy showed a UV $\lambda_{max}$ at 250 nm pointing highly conjugated double bonds systems.

Example 5

Regeneration of Chloroaluminate Ionic Liquid Catalysts by Removal of Conjunct Polymers from the Spent Catalyst by Using Aluminum Metal in the Presence of Hydrogen A 300 cc autoclave was charged with 51 gm of used (deactivated) butylpyridinium chloroaluminate ionic liquid containing 12.4 wt % (6.32 gm) conjunct polymers, 65 ml hexane, and 8 gm aluminum powder. The autoclave was pressurized to 500 psi of hydrogen gas and heated to 100° C. while stirring with an overheated stirrer at ~1200 rpm. The pressure was kept at around 550 psi by continuously re-introducing hydrogen gas. The reaction was allowed to run for 1.5 hrs at the conditions stated above. The reaction was cooled down, and the reaction mixture was separated in the glove box where the organic layer was removed by decantation. The ionic liquid-aluminum residue was rinsed with 2×50 ml anhydrous hexane. The hexane layers were all combined and dried over $MgSO_4$. Filtration and concentration of the dried hexane rinses gave 6.3 gm 99.7% of the expected conjunct polymers as pale yellow oils. The ionic liquid catalyst was separated from aluminum by filtration. Hydrolysis of 10 gm portion of the filtered ionic liquid catalyst followed by extraction with hexane showed no presence of conjunct polymers in the treated spent ionic liquid. The reaction described above was repeated once more on the same spent catalyst and led to the removal of >98% of the conjunct polymers. The reaction was repeated on 52 gm of spent butyl-pyridinium chloroaluminate catalysts containing 15.5 wt % (7.9 gm CPs) and led to removing 7.8 gm of the polymers (98.7%) from the spent catalyst. There were no conjunct polymers obtained from the hydrolysis of the treated (regenerated) ionic liquid catalysts indicating the removal of all CPs from the spent catalyst. This procedure is, by far, the most successful method for removing conjunct polymers from the spent chloroaluminate ionic liquid catalysts Example 6

Regeneration of Spent Chloroaluminate Ionic Liquid Catalysts by Removal of Conjunct Polymers from the Spent Catalyst Over a 50/50 Mixture of Aluminum and Nickel Metals in the Presence of Hydrogen A 300 cc autoclave was charged with 51 gm of deactivated butylpyridinium chloroaluminate ionic liquid containing 12.4 wt % (6.32 gm) conjunct polymers, 60 ml hexane, 4 gm of aluminum metal and 4 gm of nickel metal powders. The autoclave was pressurized to 500 psi of hydrogen gas and heated to 100° C. while stirring with an overhead stirrer at >1200 rpm. The pressure of the reaction rose gradually to 660 psi as the reaction was heating up to 100° C. and remained there the remainder of the reaction. The reaction ran for 1.5 hrs at the conditions stated above. The autoclave was then cooled down, and the reaction mixture was separated in the glove box where the organic layer was removed by decantation. The ionic liquid-aluminum residue was rinsed with 2×50 ml anhydrous hexane. The hexane layers were all combined and dried over $MgSO_4$. Filtration and concentration of the dried hexane rinses gave 6.15 gm (98%) of the expected hydrogenated conjunct polymers as pale yellow oils. The ionic liquid catalyst was separated from aluminum by filtration. Hydrolysis of 10 gm portion of the filtered ionic liquid catalyst followed by extraction with hexane showed no presence of conjunct polymers in the treated spent ionic liquid.

Example 7

Regeneration of Chloroaluminate Ionic Liquid Catalysts by Removal of Conjunct Polymers from the Spent Catalyst in the Presence of Boron Metal and Hydrogen Example 5 was repeated but using boron in place of aluminum to remove conjunct polymers from 50.2 gm of spent butylpyridinium chloroaluminate ionic liquid catalyst containing 15.3% conjunct polymers. The use of boron resulted in the removal of only 9% of the conjunct polymers present in the used catalyst based on the recovered polymers from the organic layer.

Hydrolysis of the residual ionic liquid catalyst indicated that >89% of the conjunct polymers remained in the treated catalyst.

Example 8

Regeneration of Chloroaluminate Ionic Liquid Catalyst by Removal of Conjunct Polymers from the Spent Catalyst in the Presence of Gallium Metal and Hydrogen The procedure described in Example 5 was repeated but using gallium metal in place of aluminum to remove the conjunct polymers from 50.2 gm of spent butylpyridinium chloroaluminate ionic liquid catalyst containing 15.3% conjunct polymers. The reaction resulted in the removal of 52% of the conjunct polymers based on the recovered oils in the organic phase. Hydrolysis of the residual ionic liquid catalyst indicated that 35% of the conjunct polymers remained in the treated catalyst. The remaining ~13% polymers were perhaps lost during concentration of the organic solvent (hexane) as light hydrocarbons due to decomposition and fragmentation of the conjunct polymers.

Example 9

Regeneration of Chloroaluminate Ionic Catalysts by Removal of Conjunct Polymers from the Spent Catalyst in the Presence Indium Metal and Hydrogen The procedure described in Example 5 was repeated but using indium metal in place of aluminum to remove the conjunct polymers from 51 gm of spent butylpyridinium chloroaluminate ionic liquid catalyst containing 24.4% conjunct polymers. The reaction resulted in total removal of ~80% of the conjunct polymers based on the recovery of heavy oils in the organic phase. Hydrolysis of the residual ionic liquid catalyst indicated that 10% of the conjunct polymers remained in the treated catalyst.

Example 10

Regeneration of Chloroaluminate Ionic Liquid Catalysts by Removal of Conjunct Polymers from the Spent Catalyst in the Presence of Zinc Metal and Hydrogen The procedure described in Example 5 was repeated but using zinc metal powder in place of aluminum powder to remove the conjunct polymers from 50 gm of spent butylpyridinium chloroaluminate ionic liquid catalyst containing 24.4% conjunct polymers. The reaction resulted in the removal of ~73% of the conjunct polymers based on the recovered oils in the organic phase. Hydrolysis of the residual ionic liquid catalyst indicated that ~27% of the conjunct polymers remained in the total catalyst.

Example 11

Regeneration of Chloroaluminate Ionic Liquid Catalysts by Removal of Conjunct Polymers from the Spent Catalyst in the Presence of Copper Metal and Hydrogen The procedure described in Example 5 was repeated but using copper metal in place of aluminum to remove the conjunct polymers from 50.5 gm of spent butylpyridinium chloroaluminate ionic liquid catalyst containing 15.3% conjunct polymers. The reaction resulted in the removal of 8% of the conjunct polymers based on the recovery of heavy oils in the organic phase. Hydrolysis of the residual ionic liquid catalyst indicated that 82% of the conjunct polymers remained in the treated catalyst. The remaining 10% of the conjunct polymers were perhaps lost during concentration as light hydrocarbons due to decomposition and fragmentation of the conjunct polymers.

Example 12

Regeneration of Chloroaluminate Ionic Catalysts by Removal of Conjunct Polymers from the Spent Catalyst in the Presence of Iron Metal and Hydrogen Example 5 was repeated but using iron powder in place of aluminum powder to remove the conjunct polymers from 50.4 gm of spent butylpyridinium chloroaluminate ionic liquid catalyst containing 15.3% conjunct polymers. The use of iron resulted in the removal of 10% of the conjunct polymers present in the used catalyst. Hydrolysis of the residual ionic liquid catalyst indicated that 83% of the conjunct polymers remained in the treated catalyst. The remaining 7% of the conjunct polymers may have been lost during the concentration under vacuum as light product resulting from degradation and structural changes of conjunct polymers.

Example 13

Regeneration of Chloroaluminate Ionic Liquid Catalysts by Removal of Conjunct Polymers from the Spent Catalyst in the Presence of Titanium Metal and Hydrogen The procedure described in Example 5 was repeated but using titanium metal in place of aluminum to remove conjunct polymers from 51 gm of spent butylpyridinium chloroaluminate ionic liquid catalyst containing 15.3% conjunct polymers. The reaction resulted in the removal of 5.5% of the conjunct polymers based on the recovery of heavy oils in the organic phase. Hydrolysis of the residual ionic catalyst indicated that 79% of the conjunct polymers remained in the treated catalyst. The remaining 15.5% of the conjunct polymers were perhaps lost as light hydrocarbons during evaporation due to decomposition and fragmentation reactions.

Table 1 below compares the results of removing conjunct polymers from the spent ionic liquid catalyst (used butylpyridinium chloroaluminate) by treatment with the different metals discussed in Examples 5-13.

TABLE 1

| Metal | Hydrogen (500 psi) | % CPS Removed | % CPS Remained | % CPS Lost | Total % CPs Removed |
|---|---|---|---|---|---|
| Aluminum | Yes | >99% | <1 | 0 | >99 |
| Boron | Yes | 9 | 89 | 2 | 11 |
| Gallium | Yes | 52 | 35 | 13 | 65 |
| Indium | Yes | 88 | 10 | 2 | 90 |
| Al/Ni | Yes | 98 | 0 | 2 | 100 |
| Zinc | Yes | 71 | 27 | 2 | 73 |
| Iron | Yes | 10 | 83 | 7 | 17 |
| Copper | Yes | 8 | 82 | 10 | 18 |
| Titanium | Yes | 5.5 | 79 | 15.5 | 21 |

Based on the result's discussed in the examples above, aluminum and other metals appear to effectively remove conjunct polymers from the spent catalyst. Without being bound to any theory, it appears that the removal mechanism is probably driven by an oxidative-reductive reaction where the metal is reducing the conjunct polymers and their chlorinated analogues.

Example 14

Reactivity Test on the Ionic Liquid Catalyst Regenerated by Removing the Conjunct Polymers by Treatment with Aluminum Metal The activity of the regenerated catalyst was checked by comparing its activity with the activities of the spent and freshly-made catalysts in the alkylation of isopentane with ethylene. The alkylation of isopentane with ethylene was done according to the procedure describe below. A 30.0 cc autoclave is charged with 20 gm of ionic liquid, catalyst, 100 gm anhydrous isopentane, 10 gm ethylene and 0.3 gm anhydrous HCl. The reaction was then stirred ~1200 rpm and heated to 50° C. at autogenic pressures. The starting pressure is usually 280-320 psi. The reaction is usually terminated when the pressure drops down to single digits or no further drop in the pressure is noticed. In the case of slow going reaction, the reaction was allowed to go on for 1 hr. At the end of the reaction, the reaction is vented out and a gas sample is checked by GC for ethylene concentration. The reaction mixture is let to settle into 2 phases. The organic phase is decanted and analyzed for product distribution by GC analysis.

Table 2 compares the activity of the regenerated ionic liquid catalyst over aluminum in a batch reaction with the activities of the freshly-made catalyst and the spent catalyst.

TABLE 2

| | Fresh Catalyst | Spent Catalyst | $Al/H_2$ Regen Cat. |
|---|---|---|---|
| Reaction Time | 6 min. | 60 min. | 7 min. |
| Starting Pressure | 312 psi | 304 | 298 |
| Ending pressure | 6 psi | 309 psi | 5 psi |
| iC5 wt % | 66.8 | 97.8 | 68.4 |
| C7s wt %: | 22.3 | 1.3 | 21.4 |
| 2,3-DM-Pentane | 8.8 | 1 | 8 |
| 2,4-DM-Pentane | 9.5 | 0.67 | 8.25 |
| 2,3-DMP/2,4-DMP | 0.93 | 1.51 | 0.97 |

There are numerous variations on the present invention which are possible in light of the teachings and supporting examples described herein. It is therefore understood that within the scope of the following claims, the invention may be practiced otherwise than as specifically described or exemplified herein.

What is claimed is:

1. A process for regenerating a used acidic ionic liquid catalyst comprising contacting the used ionic liquid catalyst with at least one regeneration metal in a regeneration zone in the presence of added hydrogen under regeneration conditions for a time sufficient to increase the activity of the ionic liquid catalyst.

2. The process according to claim 1, wherein the metal is selected from the group consisting of Group III-A and II-B elements and their mixtures.

3. The process according to claim 1, wherein the metal is selected from the group consisting of aluminum, indium, gallium and zinc.

4. The process according to claim 1, wherein the metal is in a microscopic form.

5. The process according to claim 1, wherein the metal is in a macroscopic form.

6. The process according to claim 1, wherein the regeneration zone contains an inert hydrocarbon in which conjunct polymers are soluble.

7. The process according to claim 6, wherein the inert hydrocarbon is selected from the group consisting of normal hydrocarbons ranging from $C_5$ -$C_{15}$ and their mixtures.

8. The process according to claim 1, wherein the used ionic liquid catalyst has been used to catalyze a Friedel-Crafts reaction.

9. The process according to claim 8, wherein the Friedel-Crafts reaction is alkylation.

10. The process according to claim 1, wherein the used ionic liquid catalyst comprises an imidazolium, pyridinium, phosphonium or tetralkylammonium derivative, or their mixtures.

11. The process according to claim 1, wherein the used ionic liquid catalyst is a chloroaluminate ionic liquid.

12. The process according to claim 11, wherein the metal is aluminum.

13. A process for regenerating a used acidic ionic liquid catalyst which has been deactivated by conjunct polymers comprising the steps of contacting the used ionic liquid catalyst with at least one regeneration metal in a regeneration zone in the presence of added hydrogen under regeneration conditions in the presence of an inert hydrocarbon in which conjunct polymers are soluble for a time sufficient to increase the activity of the ionic liquid catalyst.

14. The process according to claim 13, wherein the inert hydrocarbon is selected from the group consisting of normal hydrocarbons ranging from $C_5$ -$C_{15}$ and their mixtures.

15. The process according to claim 13, wherein the metal is selected from the group consisting of Group III-A and II-B elements and their mixtures.

16. The process according to claim 13, wherein the metal is selected from the group consisting of aluminum, indium, gallium and zinc.

17. The process according to claim 13, wherein the metal is in a microscopic form.

18. The process according to claim 13, wherein the metal is in a macroscopic form.

19. The process according to claim 13, wherein the used acidic ionic liquid catalyst has been used to catalyze a Friedel-Crafts reaction.

20. The process according to claim 19, wherein the Friedel-Crafts reaction is alkylation.

21. The process according to claim 13, wherein the used acidic ionic liquid catalyst comprises an imidazolium, pyridinium, phosphonium or tetralkylammonium derivative, or their mixtures.

22. The process according to claim 13, wherein the used acidic ionic liquid catalyst is a chloroaluminate ionic liquid.

23. The process according to claim 22, wherein the metal is aluminum.

* * * * *